Dec. 2, 1930. A. J. G. BOLARD 1,783,822
AUTOMOBILE JACK
Filed Jan. 7, 1928 2 Sheets-Sheet 1

INVENTOR
Alfred J. G. Bolard
BY Townsend + Decker
ATTORNEYS.

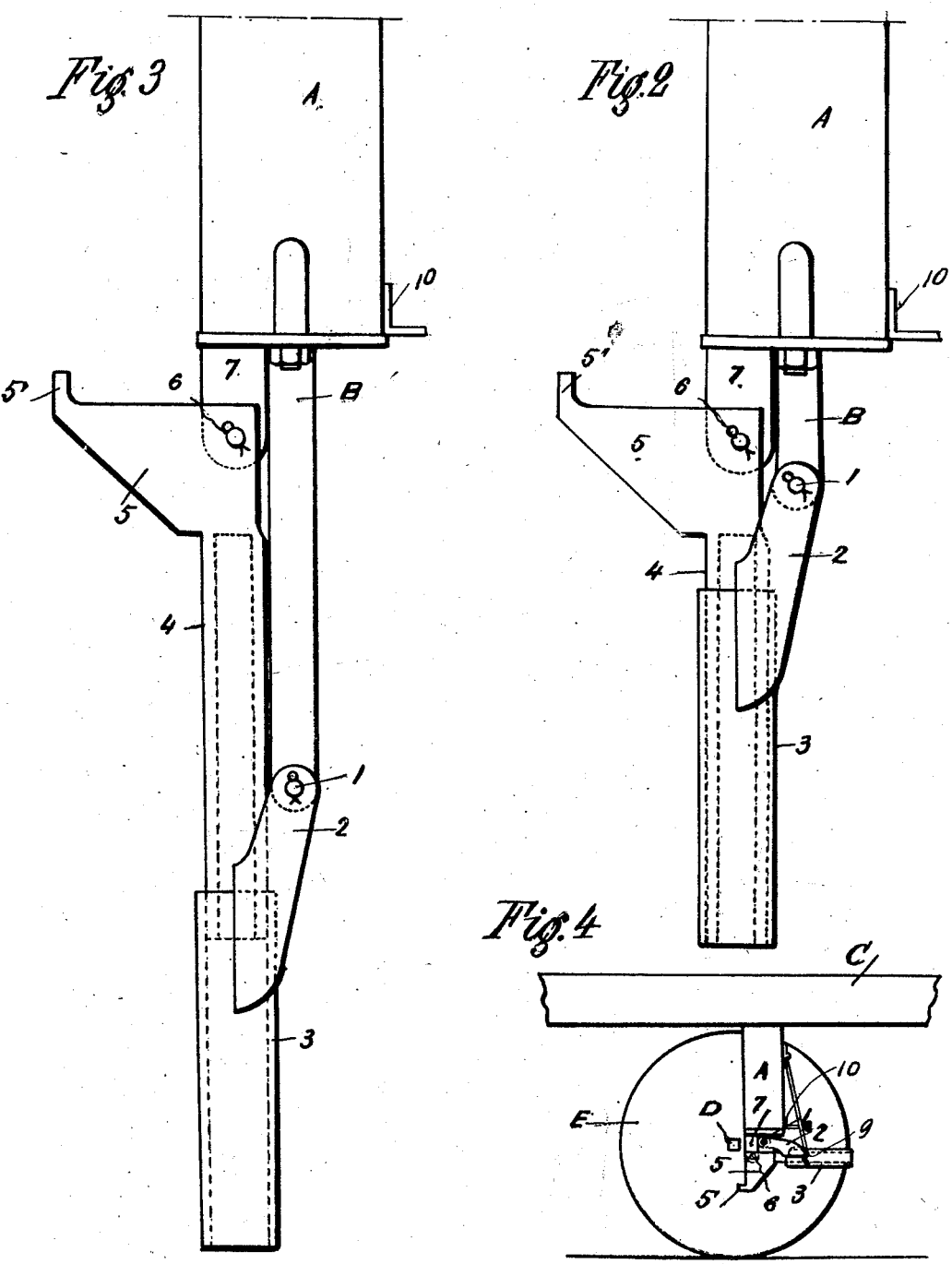

Patented Dec. 2, 1930

1,783,822

UNITED STATES PATENT OFFICE

ALFRED JEAN GUSTAVE BOLARD, OF VERNON, FRANCE, ASSIGNOR TO "RUSBOL," SOCIÉTÉ À RESPONSABILITÉ LIMITÉE, OF CLICHY, FRANCE, A CORPORATION OF FRANCE

AUTOMOBILE JACK

Application filed January 7, 1928, Serial No. 245,091, and in France December 7, 1927.

My invention relates to improvements in automobile jacks and more particularly to an improved means for fixing the jack to the vehicle as well as the disposition of the jack with respect to the elements of the vehicle.

According to my invention, an ordinary jack consisting of two parts, one movable with respect to the other, such as a cylinder and a plunger, for example, has one of the said parts fixed to the chassis of the vehicle and is provided with means which cause the jack from the time it begins to operate to hook over the hub, axle or spring of the vehicle in such a manner that the chassis and the wheel are simultaneously raised by the jack from the instant that the said jack touches the ground.

The advantages and objects of such a disposition of elements will be obvious to those skilled in the art to which this invention relates. The jack being fixed to the chassis of the vehicle is elastically suspended and does not have to endure the counter thrust of the shocks to which the hub and wheels of the vehicle are subjected. The hooking of the jack over the hub, the wheel or the spring is furthermore absolutely indispensable in order to produce the lifting of the wheel which lifting would not be produced if the jack were simply fastened to the chassis and adapted to bear against the ground.

The hooking of the jack over the hub, wheel or spring can be brought about by any suitable means. For example, a latching device may be pivoted to the jack which enters into action as soon as the jack is rocked in such a manner as to cause the wheel, spring or hub to be caught thereby. Continued action of the jack is adapted to lower a rod or foot which comes into contact with the ground and permits subsequent simultaneous raising of the chassis and the hub.

To this end the rod or foot destined to come into contact with the ground can be articulated on one of the movable elements of the jack and adapted to slide along a guide carrying the latching device above mentioned.

In the accompanying drawing is shown by way of example one embodiment of the present invention.

In the drawing—

Fig. 2 is a corresponding view of the jack in one of its operative positions;

Fig. 3 is another corresponding view illustrating the jack in another of its operative positions;

Fig. 4 is a diagrammatic showing of the jack mounted on a chassis in the position of rest;

Figure 1:
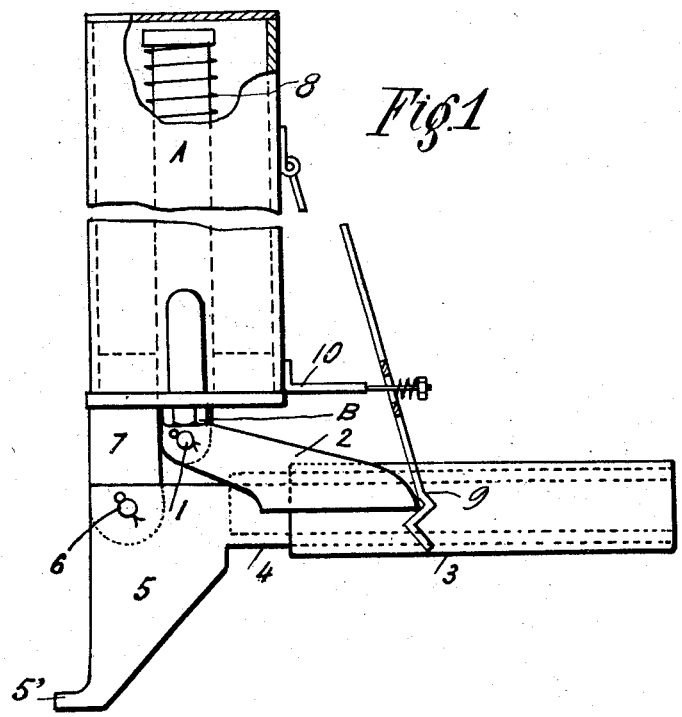
Fig. 1 is an elevational view of a jack in the position of rest.

The jack consists of a body A upon the interior of which a piston is adapted to be displaced by means of an appropriate fluid under pressure, the piston rod only thereof being visible at B, the said fluid being admitted into the interior of the body A by any appropriate devices. The elements so far described are well known in the art and since they form no particular part of the present invention need not be discussed in detail here.

The body A of the jack is mounted directly by suitable means on the chassis C of the automobile vehicle.

Carried by the extremity of the piston rod B is a stud 1 upon which is pivoted an element 2 rigidly fixed to a tubular jack foot 3, destined to come into contact with the ground. The said foot slides along a rod 4 terminating in a bracket 5 pivoted on a stud 6 carried by an ear 7 rigid with the jack body A.

The spring for returning the jack shoe to inoperative position may be positioned within the body A as indicated at 8. The spring 8 bears against the lower end of the body A and against a head B' or cross pin carried by the inner end of the piston B. In order to hold the jack foot 3 more securely in elevated or inoperative position the gripper 9, pivotally supported on the body A, is spring-tensioned to engage a suitable projection on the jack foot, as for example the element 2. The gripper 9 may be maintained in position to engage and hold the jack foot by any suitable means as for example by the bracket 1D. The gripper 9 is, as shown, of the self-releasing type so that pressure on the piston rod B produces the release of the foot 3 from the gripper.

The operation of the jack is as follows:

When the jack is at rest (Figs. 1 and 4), the foot 3 of the jack is maintained in horizontal position either by a spring on the interior of the jack which maintains the jack piston in elevated position or by a suitable exterior latching arrangement such as pivoted jaws and springs fixed to the jack body.

Figure 5:
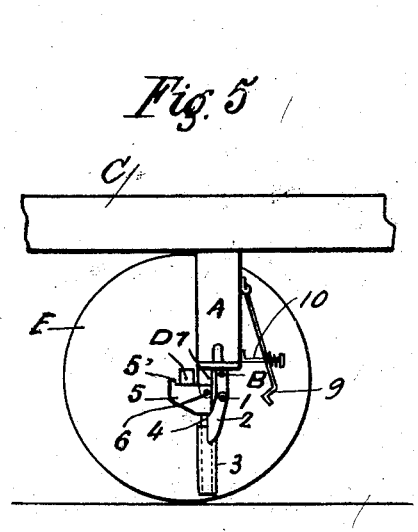
Fig. 5 is a similar view with the jack in one of its operative positions.
Figure 6:
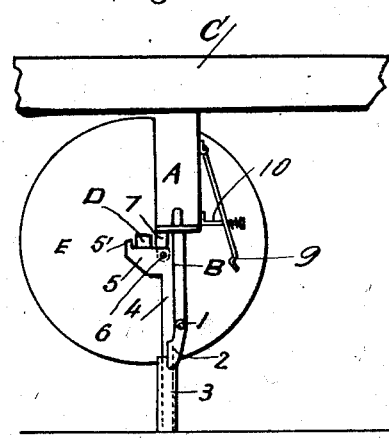
Fig. 6 is still another similar view with the jack in another of its operative positions.

When the fluid under pressure commences to act in the jack body and to push the piston toward the bottom, the rod B swings the foot 3 and its rod about the fixed pivot point 6 (Figs. 2 and 5). During this rocking movement of the foot 3, the bracket 5 is placed beneath the hub D of the vehicle. As shown on the drawing the said bracket 5 is provided with a guard member 5' to prevent the hub D from sliding off the bracket 5.

The pressure of the fluid continuing to act in the jack body, the foot 3 is pushed toward the bottom by the piston rod B along the rod 4 until the extremity of the said foot comes into contact with the ground. At this instant the foot 3 becomes stationary since neither said foot nor its piston rod B can be moved any further. Consequently the jack body A commences to rise carrying with it the rod 4, which is free to slide within the foot 3 and the said rod in turn carries with it the hub or axle D by means of the bracket 5 thereon which as previously explained is hooked under the same.

The hub and the chassis of the vehicle are thus simultaneously lifted by the action of the jack.

When the fluid pressure is released the jack body A starts to descend, lowering the chassis and the hub under the action of suitable means such as a return spring. When the wheel E comes into contact with the ground the piston B rises carrying with it the jack foot 3 first vertically along the rod 4 and then rocking the said foot to its original horizontal position.

Having thus described my invention, what I claim as new and desire to secure by Letters Patent is—

1. In an automatic jack for automobiles having a chassis and a wheel hub, the combination of fluid operated means fixed to said vehicle, a piston rod associated with said means, a jack foot pivoted to the extremity of said piston rod, means for engaging said hub carried by said first mentioned means and means associated with said piston rod, said jack foot and said hub engaging means for causing said chassis and said hub to be lifted simultaneously when said jack foot engages the ground.

2. In an automatic jack of the type described the combination of a pressure cylinder, a piston rod operated thereby, a jack foot pivoted to said piston rod, a hub lifting bracket pivoted to said cylinder, and means on said bracket slidably engaging said jack foot for the purpose set forth.

3. In an automatic jack of the type described the combination of a pressure cylinder, a piston rod operated thereby, a tubular jack foot pivoted to said piston rod, a hub lifting bracket pivoted to said cylinder and a rod on said bracket slidably engaging said tubular foot for the purpose described.

4. In an automatic jack of the type described the combination of a pressure cylinder, a piston rod operated thereby, a bracket pivoted on said piston rod at the extremity thereof, a tubular jack foot fixed to said bracket, a hub lifting bracket pivoted to said cylinder and a rod on said bracket slidably engaging said tubular jack foot for the purpose described.

5. In an automatic jack of the type described the combination of a vertically disposed pressure cylinder carried by the object to be lifted, a piston rod operated thereby, a jack foot pivoted to said piston rod, a hub lifting bracket pivoted to said cylinder and adapted to be swung under a hub of the object to be lifted when said jack foot touches the ground, means for returning said jack foot to horizontal position when the pressure in said cylinder is released and releasable means for retaining said jack foot in horizontal position for the purpose disclosed.

6. In an automatic jack of the type described the combination of a vertically disposed pressure cylinder carried by the object to be lifted, a piston rod operated thereby, a jack foot pivoted to said piston rod, a hub lifting bracket pivoted to said cylinder, means on said bracket slidably engaging said jack foot, means for automatically returning said jack foot to horizontal position when the pressure in said cylinder is released and releasable means for retaining said jack foot in horizontal position for the purpose disclosed.

In testimony whereof I have affixed my signature.

ALFRED JEAN GUSTAVE BOLARD.